INVENTOR.
DAVID RASPET

BY

Robert Kern Duncan
ATTORNEY

INVENTOR.
DAVID RASPET
BY
Robert Kern Duncan
ATTORNEY

INVENTOR.
DAVID RASPET
BY
Robert Kern Duncan
ATTORNEY

INVENTOR.
DAVID RASPET

BY

Robert Kern Duncan
ATTORNEY

INVENTOR.
DAVID RASPET
BY
Robert Kern Duncan
ATTORNEY

INVENTOR.
DAVID RASPET
BY
Robert Ken Duncan
ATTORNEY

INVENTOR.
DAVID RASPET
BY
Robert Ken Duncan
ATTORNEY

INVENTOR.
DAVID RASPET
BY
Robert Ken Duncan
ATTORNEY

United States Patent Office 3,437,847

Patented Apr. 8, 1969

3,437,847

CASCADED THERMIONIC-THERMOELECTRIC DEVICES UTILIZING HEAT PIPES

David Raspet, Inglewood, Calif., assignor to the United States of America as represented by the Secretary of the Air Force Filed Aug. 29, 1967, Ser. No. 664,224
Int. Cl. H02n 3/00, 7/00
U.S. Cl. 310—4 8 Claims

ABSTRACT OF THE DISCLOSURE

A "heat pipe" energy transfer system is used to transfer the heat flux from the thermionic generator to the thermoelectric generator of thermionic-thermoelectric converters. A stainless steel heat pipe with capillary grooves conducts the heat flux, with negligible temperature drop and heat flux loss, from the small area high heat flux density of the thermionic surface to the large area relatively low heat flux density of the thermoelectric surface.

BACKGROUND OF THE INVENTION

The field of this invention is in devices for generating an electrical current directly from the heat flux radiated from heat sources such as radio isotopes, solar concentrators, nuclear reactors, or chemical reactions.

Thermionic-thermoelectric devices for converting heat energy directly to electrical energy are well known, as exemplified by Patent No. 3,189,765, entitled "Combined Thermionic-Thermoelectric Converter," issued June 15, 1965. Their use is found particularly advantageous for generating electricity in outer space.

A serious problem existing with the current state-of-the-art devices is that of failure of the thermoelectric device due to the high heat flux density passing through it. This has been due to the fact that cascaded thermionic-thermoelectric devices have had the thermoelectric converting elements adjacent the thermionic elements and there has been effectively a mismatch between the minimum thermionic heat rejection flux density and the maximum thermoelectric heat input flux density for optimum performance.

SUMMARY OF THE INVENTION

An improved thermionic-thermoelectric converter is provided by using a heat pipe interposed the thermionic generator and the thermoelectric generator to match the thermal impedance of a thermionic generator to that of a thermoelectric generator. The improved device is more efficient and more reliable than prior devices. The heat pipe spreads the heat flux from a small area to a large area, thus decreasing the heat flux density. By this means both the thermionic generator and the thermoelectric generator may operated more effectively and the failure of thermoelectric generators due to fracture and warpage is avoided.

The disclosed device combines cascaded thermionic and thermoelectric energy converters in a novel manner to realize a higher efficiency than either device is capable of separately. Heat is rejected from conventional efficiently operating thermionic converters at moderately high temperatures (around 900° K.) and at a high heat flux (approximately 50 watts per square centimeter). This temperature is compatible with conventional lead telluride (PbTe) thermoelectric converter hot side temperatures. However, the heat flux density is well beyond the practical capability of PbTe. The low thermal conductivity of other known thermoelectric materials, that might otherwise tolerate this heat flux density, prohibits their effective usage.

The heat pipe system herein disclosed is inserted between the thermionic converter and the thermoelectric converter. It accepts the heat rejection flux from the relatively small area of the thermionic converter's collector and transfers it to a large area where it is received by the thermoelectric hot side. The heat pipe performs this function with no external power and very small (negligible) temperature drops.

BRIEF DESCRIPTION OF THE DRAWING

FIG. 9 is an illustrative representation of a heat pipe having capillary grooves;

Referring to FIG. 1, a cascade thermionic-thermoelectric converter utilizing heat pipes is shown in simplified form. The cylindrical heat source element 1 may be a radioisotope. It is surrounded by the cylindrical thermionic converter element 2. The heat flux flowing radially outward from the heat source is thus received by the thermionic converter and part of the heat flows through the thermionic element with some of the heat energy being converted to electrical energy. The heat pipes 3 conduct and transform the heat flux from the high heat flux density at the surface 5 of the thermionic converter to the surfaces 6 of the thermoelectric converters 4 at a much lower heat flux density. The heat flux energy then in passing through the thermoelectric converters generates additional electric energy. The geometry of the device provides large increases in thermoelectric hot side area without requiring large increases in total converter radius. For example, a particular six-point configuration, with a cylindrical thermionic converter, has a 5 to 1 hot side thermoelectric area to thermionic collector area ratio with an overall radius increase of only 3.7 to 1. A ten-pointed configuration with a radius increase of 2.6 to 1 will also provide a 5 to 1 area ratio. For different ratios from the 5 to 1 area ratio the radial length of the heat pipe may be varied accordingly and the number of points chosen to suit an overall physical space requirement. In addition the axial lengths of the heat pipes may be made longer at the thermoelectric surfaces than they are at the thermionic surface thus still providing a greater ratio of surface area at the thermoelectric surface to that at the thermionic surface. The heat pipes are closed systems; each heat pipe is sealed at the ends, evacuated, and charged with a suitable heat transfer agent.

FIG. 2 is a simplified view of an embodiment of the invention as applied to planar thermionic converters. The heat pipes 11 conduct the thermal energy traversing the thermionic converter 10 to the thermoelectric converters 12. As in the previous embodiment the heat pipes transform the heat flux from a high heat flux density region to a lower heat flux density.

Figure 1:
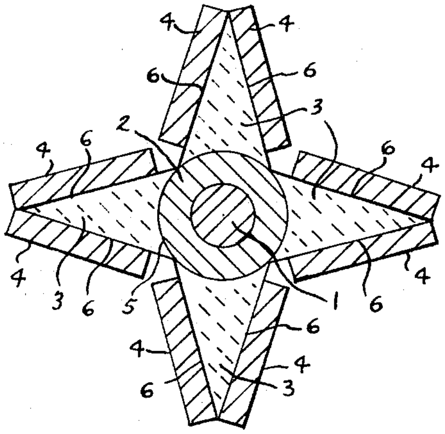
FIG. 1 is a simplified symbolic representation of a cascade converter having a cylindrical thermionic converter.

All electrical wiring connections for extracting the electrical energy from the thermionic and thermoelectric converters are omitted from the drawing as such are old, obvious, and well documented in the prior art, and in addition they do not form a part of this invention.

The efficiency of the cascaded system is expressed by:

$$N_1+N_2-N_1N_2=N_t$$

where:

$N_1$=the efficiency of the thermionic device,
$N_2$=the efficiency of the thermoelectric device, and
$N_t$=the efficiency of the cascaded system.

Current state-of-the-art thermionic devices provide optimum efficiency with a collector temperature of about 900° to 1000° K. The preferred state-of-the-art thermoelectric devices are fabricated of PbTe (lead telluride) and they produce efficiencies of approximately 1.8 percent per 100° K. drop through the device in the temperature range of approximately 1000° K. to 400° K. Hence, an efficiency of approximately 31.75 percent may be obtained with a 25 percent thermionic efficiency and a thermoelectric temperature drop of approximately 500° K. Maximum efficiency and reliability may be obtained, however, only when each device operates at its optimum heat flux density. (Approximately 50 thermal watts per square centimeter for thermionic devices and approximately 10 thermal watts per square centimeter for thermoelectric devices are representative values.)

Even though it appears that only a relatively small increase in efficiency may be obtained by using the structure as taught by this invention, it means that a pure thermionic device would require 1.27 times as much heat to produce as much electricity as the cascaded structure herein disclosed. A pure thermoelectric device would require about 3.5 times as much heat to produce the same amount of power. A typical radioisotope material weighs about 7 pounds per thermal kilowatt (without shielding) and currently costs 3 million dollars per thermal kilowatt. It is readily apparent that reducing the required fuel inventory even a relatively small amount will provide a great improvement in the system weight and cost.

Figure 3:
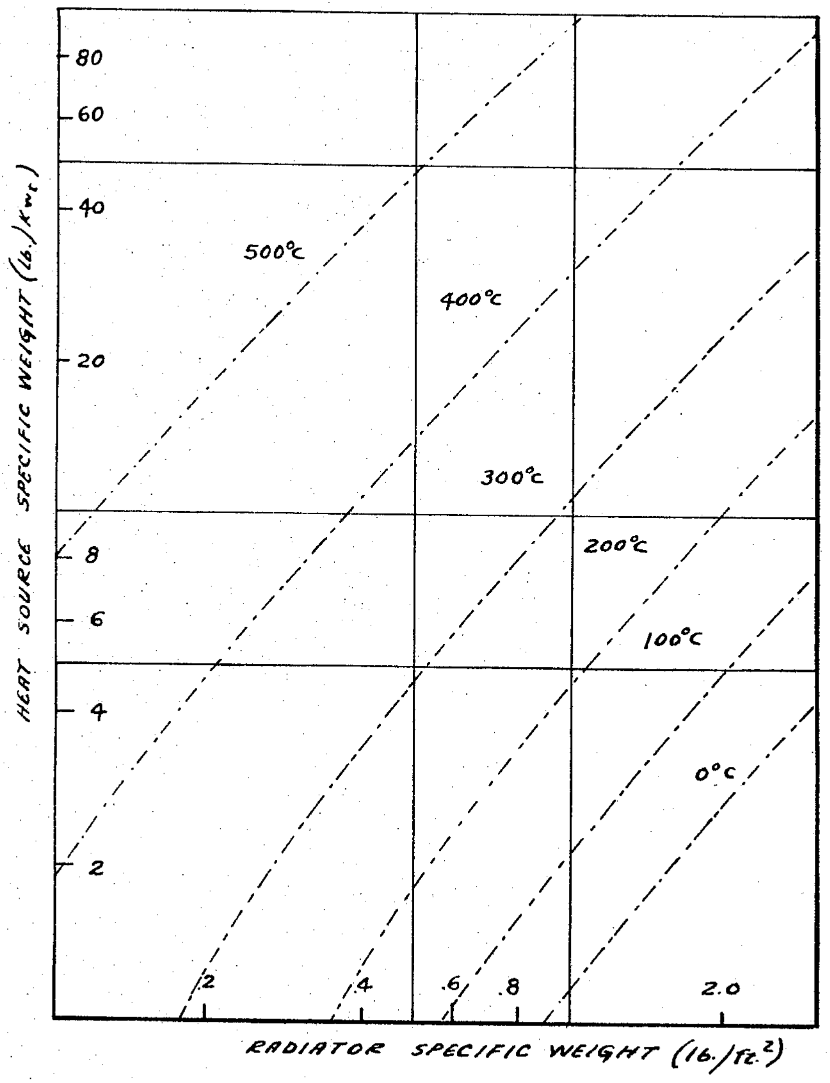
FIG. 3 is a graph of the thermoelectric temperature drop which yields minimum system weight as a function of the heat source and the radiator specific weight.

The structure as disclosed herein is particularly suited for high weight heat sources and low weight radiators. FIG. 3 is a family of curves for a system having the constants:

| | |
|---|---|
| Thermionic efficiency | 25 percent. |
| Thermionic specific weight | 1.2 lb./kw$_e$. |
| Thermoelectric efficiency | $1.8\times10^{-4}\times\Delta T$. |
| Thermoelectric specific weight | 17.6 lb./kw$_e$. |

Figure 4:
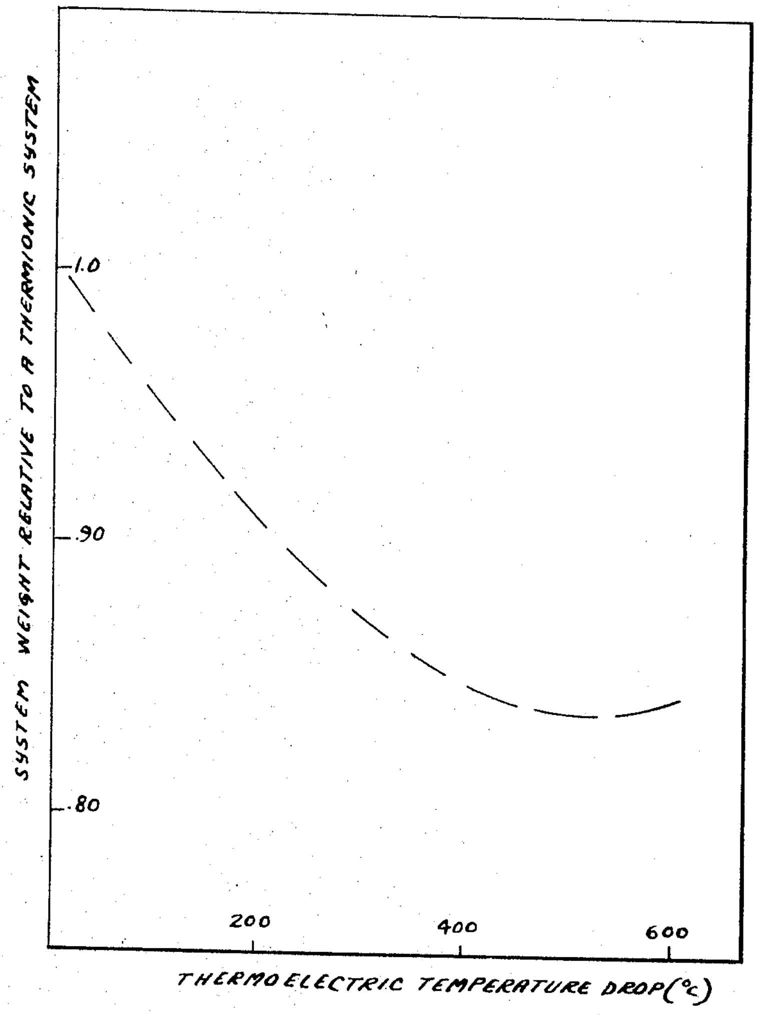
FIG. 4 is a graph of the cascade system weight relative to a thermionic system as a function of thermoelectric converter temperature drop.

The plot indicates the temperature drop through the thermoelectric converter which yields the minimum weight system, with the heat source weight (lbs. per thermal kilowatt) and radiator weight (lbs. per sq. ft.) the dependent variables. For example, with a radiator specific weight of 1.0 lb./ft.$^2$ and a heat source specific weight of 100 lb./kw$_t$ the optimum ΔT is seen to be approximately 500° C. From FIG. 4 where the thermoelectric temperature drop is plotted against the system weight relative to a pure thermionic system weight, it is seen that the new system weighs approximately 83 percent of the weight of a pure thermionic device. This invention thus provides a lighter weight system. Further, the higher efficiency of the cascaded devices utilizing heat pipes reduces the required heat source weight to provide a given electrical output.

For radioisotope heated systems this reduced cost of the expensive isotope is extremely desirable.

Figure 5:
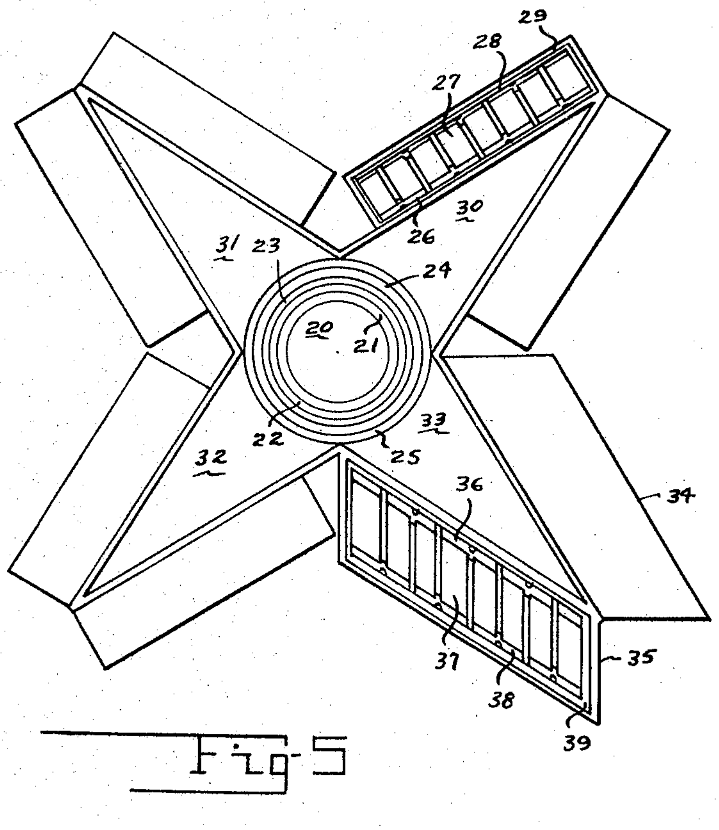
FIG. 5 is a simplified symbolic representation of a cascade converter configuration for cylindrical thermionic converters illustrating two alternate thermoelectric module configurations.

FIG. 5 is a composite representative picture showing two alternate thermoelectric module configurations. While a thermionic-thermoelectric converter could be constructed just as the view shows, generally only one configuration of thermoelectric module would be used. That is, either all the thermoelectric modules would have the configuration exemplified by modules 34 and 35, or they would all be like the remainder of the modules in the picture. The module construction exemplified by modules 34 and 35 are preferred over the other exemplified construction because the complete surface of the heat pipe contacts the module. In the other arrangements shown the thermoelectric module construction is simpler, but it is not quite as efficient thermally.

The heat source 20, with heat source contains 21, supplies the radiant heat energy. The heat source container is surrounded by the emitter insulator 22. The thermionic emitter 23, the interelectrode gap 24 and the thermionic collector 25 constitute the represented thermionic device. The thermoelectric modules about heat pipes 30, 31 and 32 have a hot strap 26, a thermoelectric element 27, a cold strap 28, and an insulating layer 29. In the alternate module configuration represented by 34 and 35 the hot strap 36, the thermoelectric element 37, the cold strap 38 and the insulating layer 39 represent the thermoelectric device.

Figure 2:
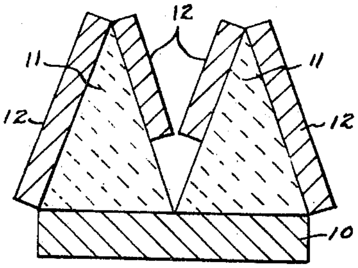
FIG. 2 is a simplified symbolic representation of a cascade converter having a planar thermionic converter.
Figure 6:
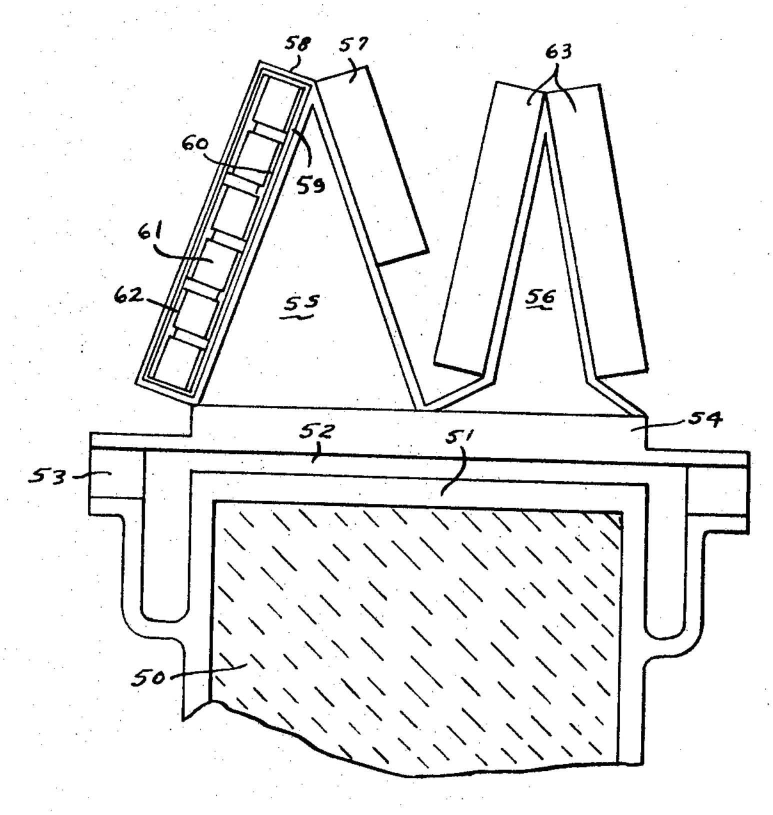
FIG. 6 is a simplified symbolic representation of a cascade converter configuration for planar thermionic converters illustrating two alternate thermoelectric module configurations.

The geometry of typical cascaded devices for planar thermionic converters is shown in FIG. 6. Two alternate thermoelectric module configurations are shown. The modules 57 and 58 about heat pipe 55 are like those in the representative showing of FIG. 2. An alternate embodiment construction is shown in the modules 63 and heat pipe 56. The flow of thermal energy is from the heat source 50 through the thermionic converter having emitter 51, interelectrode gap 52 and collector 54, then by way of the heat pipes to the thermoelectric converters having ceramic insulating layer 59, hot strap 60, thermoelectric element 61 and cold strap 62. Ceramic seal 53 seals the interelectrode gap and insulates the thermionic emitter and collector. As previously pointed out the number and length of the heat pipes perpendicular to the flow of heat from the thermionic device may be varied to provide the proper heat flux density to the thermoelectric device. Further as in cylindrical thermionic converters where the axial length of the heat pipe may be made longer at the thermoelectric surface than at the thermionic surface the length of the heat pipe in the planar device may be increased at the thermoelectric converter relative to its length at the thermionic converter to provide further flexibility in the packaging of the system while still providing the desired flux density transfer ratio.

The insulating layer 29 and 39 of FIG. 5 and 59 of FIG. 6 is used to insulate the thermoelectric elements from the thermionic converter and from each other. This insulating layer should also be a good conductor of heat to assure a low temperature drop. Ceramic materials such as aluminum oxide ($Al_2O_3$), beryllium oxide (BeO), and boron nitride (BN) are well known in the art and have been found to be suitable insulating materials.

Final heat rejection, that is the heat energy that passes through the thermoelectric converter, can be accomplished by any of the well known techniques. For ground applications the thermoelectric cold side may be cooled by forced-air circulation, or for short duration application such as emergency power, or peak power, thermal energy storage materials such as paraffins or water may be used to undergo a phase transition to absorb the waste heat. The parafin would be melted and thew ater boiled to absorb the heat.

Figure 7:
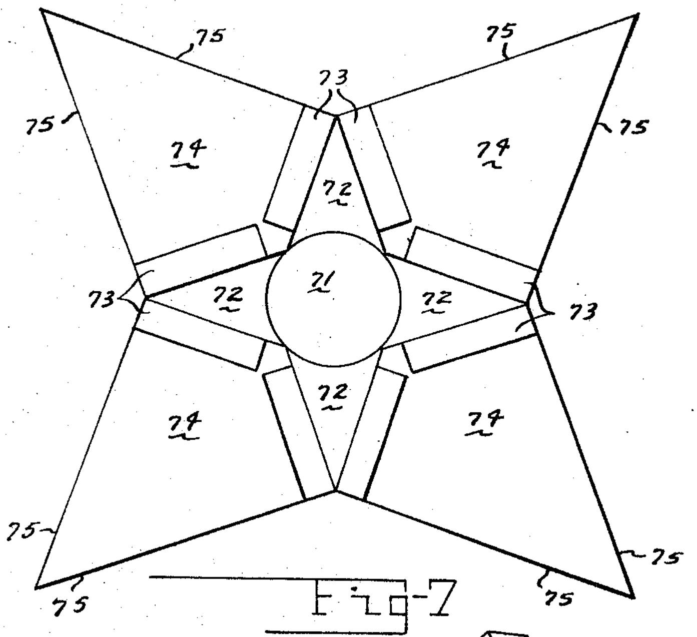
FIG. 7 is a simplified symbolic representation of a direct radiation cooled cascade converter.

For space application a second set of heat pipes may be used as shown in FIG. 7. Here the heat from the thermionic converter and heat source 71 is spread by the heat pipes 72 to the thermoelectric modules 73. The waste heat passing through the thermoelectric converter modules is then spread by additional heat pipes 74 to high emissivity surfaces 75 where it is dissipated into the ambient surrounding space.

Figure 8:
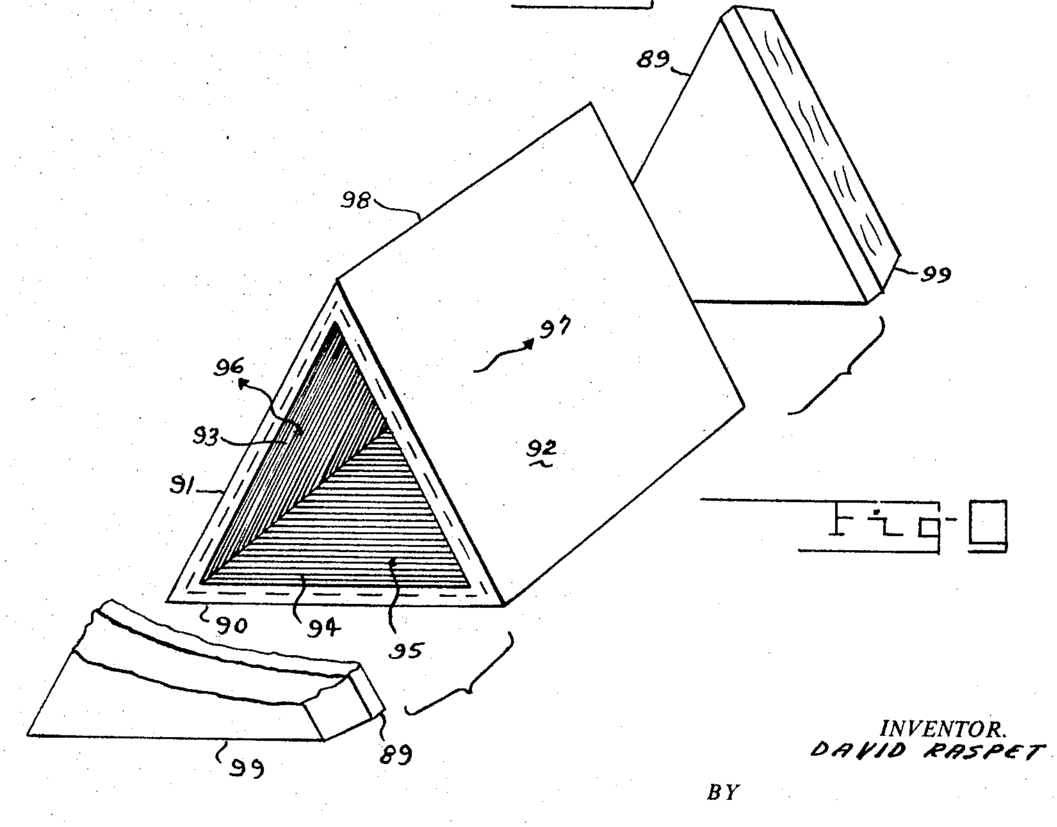
FIG. 8 is a side view of a pumped loop radiator cooled cascade converter.
Figures 8, 8A:
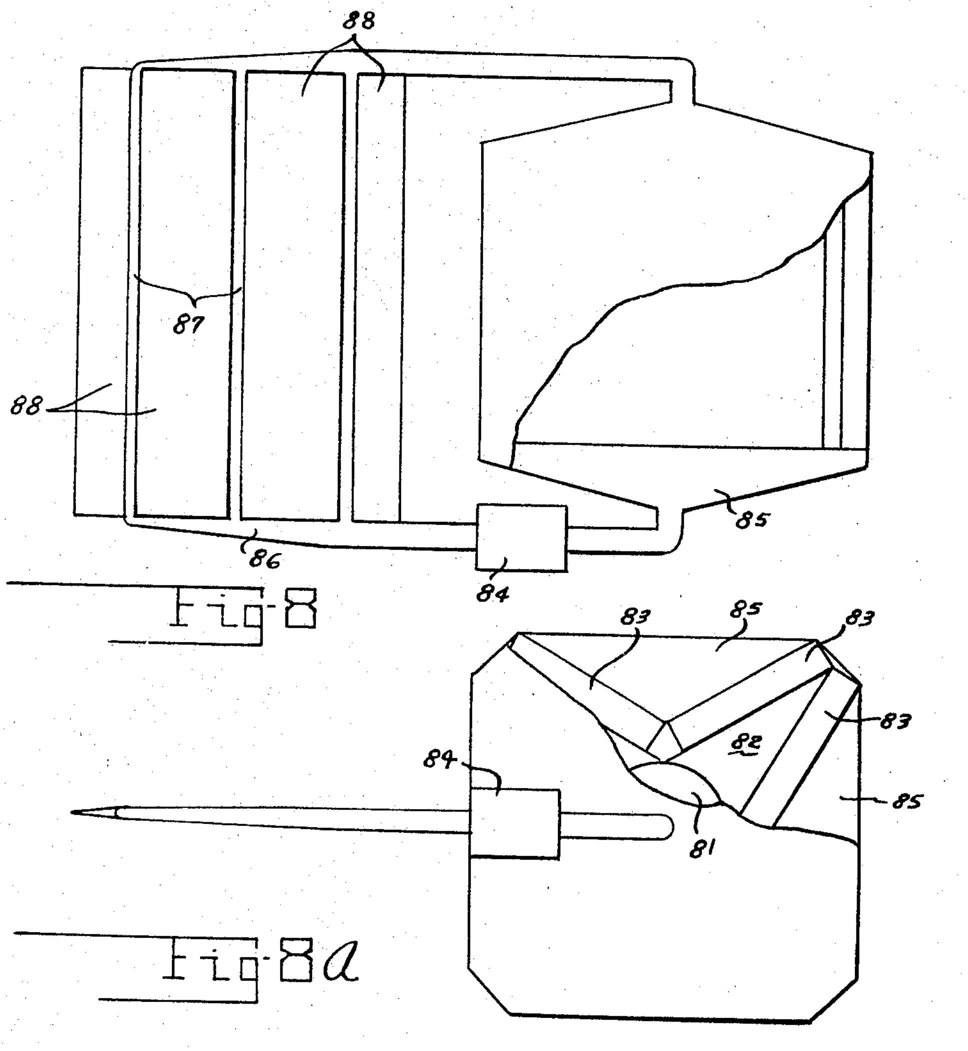
FIG. 8*a* is a bottom view of the pumped loop radiator cooled cascade converter shown in FIG. 8.

A complete system utilizing a pumped loop, radiator cooled, waste heat removal system is shown in FIG. 8. As in the prepious systems, the heat passing through the thermionic converter 81 is spread by the heat pipes 82 to the thermoelectric converters 83. The heat that passes through the thermoelectric converters enters coolant passages 85. The coolant which may be a liquid or a gas, or both, carries the waste heat energy through the manifold 86 and tubes 87 to the radiator fins 88 where it is dissipated. The pump 84 provides the circulation of the coolant. The coolant passages are not to be confused with heat pipes.

A pictorial representation (not to scale) of a typical embodiment of a heat pipe is shown in FIG. 9. This detailed heat pipe is similar to those shown at 11 in the simplified view of FIG. 2. A suitable material for the heat pipe 98 has been found to be number 316 stainless steel. In this embodiment surface 90 contacts the cold surface of the thermionic converter and surfaces 91 and 92 contact the hot surfaces of the thermoelectric converters. Thus the heat flow is as shown by the arrows 95, 96 and 97. It has been found desirable to provide capillary grooves 93 aligned parallel to the direction of heat transfer in the interior of the heat pipe; particularly on the interior surfaces of that portion of the pipe that contacts the thermoelectric elements. The interior surface 94 of the pipe opposite the thermionic converter may also be grooved, as may the exterior of the thermionic collector 25 of FIG. 5. Or, the heat pipe may be a contiguous strainless steel enclosure cylindrical curved to contact and physically fit against the thermionic collector.

Figure 10:
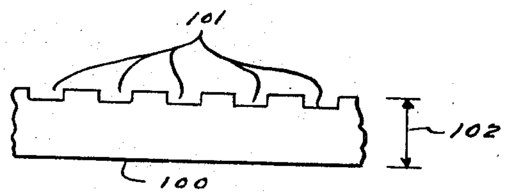
FIG. 10 is a cross section view of an illustrative heat pipe wall showing the capillary grooves.

FIG. 10 shows a detail view of the capillary grooves. A groove width of approximately 1 mm. and a depth of approximately .4 mm. has been found to be satisfactory. The wall thickness 102 of the heat pipe wall 100 is not critical. Generally, the wall thickness is detremined by mechanical strength considerations depending upon the physical forces to which the system will be subjected; the ideal wall being the thinnest wall that will provide the required mechanical strength. The end plates 89 sealing the pipes are also fabricated of stainless steel. They are not grooved and are coated on the outside with a conventional thermal insulating material 99. They may be grooved and have additional thermoelectric elements placed thereon.

Figure 11:
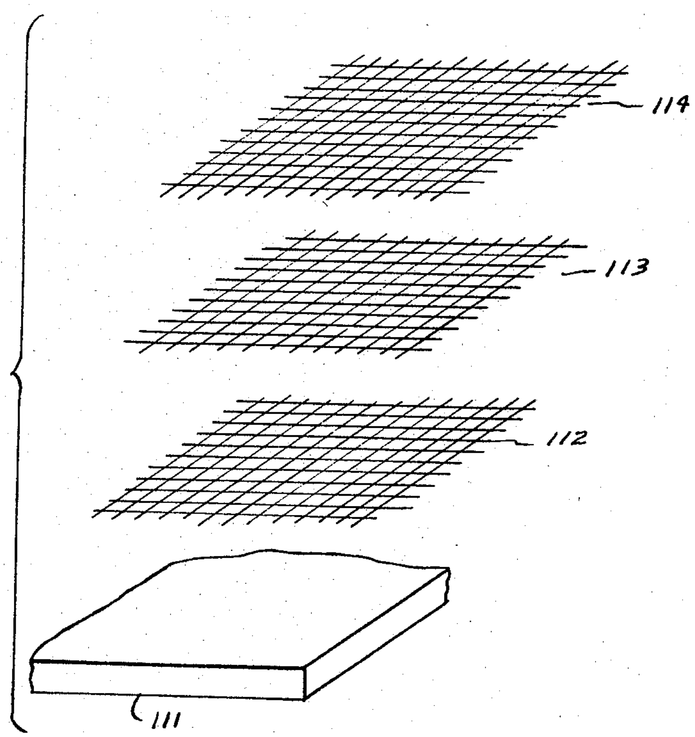
FIG. 11 is a representative, exploded view of a heat pipe wall having three layers of mesh screen.

In some structural designs a grooved wall structure may be difficult to fabricate. A satisfactory, though generally not quite as efficient, substitute for the grooved construction has been found to be three layers of fine mesh (60 to 100) stainless steel screen as shown in the exploded view of FIG. 11. Screen 112 is positioned against stainless steel wall 111 with the screen 113 on top of, and against, screen 112 and screen 114 on top of, and against, screen 113. The screens may be held in place by conventional spot welding and conventional clamping action at adjoining surfaces.

After the heat pipes have been fabricated they are evacuated by conventional means and a small amount of a heat transfer agent introduced into the evacuated enclosed volume. Liquid potassium has been found to be a suitable heat transfer agent. The amount of potassium is not critical, a suitable amount is enough to approximately fill the capillary grooves or coat the wire mesh (fill the pores). In operation a flow of the potassium occurs to distribute the heat flux from the smaller hot surface area to the larger area cold surface reducing the heat flux density. The potassium boils (vaporizes) on the hot surface of the wall that is in thermal contact with the thermionic converter and condenses on the cold wall surfaces in thermal contact with the thermoelectric converters and flows via the capillary grooves back to the hot surface. While the terms "hot" and "cold" are used to describe the wall temperatures it is to be understood that a relative condition only is implied with the temperature difference being quite small.

What I claim is:

1. The improvement in a thermionic-thermoelectric converter having a heat source emitting heat flux, thermionic converting means having a heat rejection flux density, and thermoelectric converting means having an optimum input heat flux density, the improvement comprising: heat pipe means interposed the thermionic converting means and the thermoelectric converting means for matching the heat rejection flux density of the thermionic converting means to the optimum input heat flux density of the thermoelectric converting means.

2. The improvement in a thermionic-thermoelectric converter having a heat source emitting heat flux, thermionic converting means receiving the said heat flux and providing a heat rejection flux, and thermolectric converting means receiving the said heat rejection flux, the improvement comprising: heat pipe means cooperating with the said thermionic converter and the said thermoelectric converter for reducing the density of the said received heat rejection flux.

3. In a thermionic-thermoelectric converter having a source of heat flux, a thermionic converting element having a heat rejection flux density, and a thermoelectric converting element having an input heat flux density of lower value than the said heat rejection flux density, the improvement for reducing the said heat rejection flux density to the said input heat flux density of the thermoelectric element comprising:

(a) closed heat pipe means having:
  (1) a hot surface and a cold surface;
  (2) a heat transfer agent contained therein in essentially an evacuated volume;
  (3) flow means interior the said heat pipe cooperating with the said heat transfer agent for providing a return flow of the heat transfer agent from the said cold surface to the said hot surface;

(b) the said heat pipe means interposed the said thermionic converting element and the said thermoelectric converting element with the said hot surface being in thermal contact with the said thermionic converting element and the said cold surface being in thermal contact with the said thermoelectric converting element.

4. The improvement, as claimed in claim 3, wherein the said heat transfer agent is potassium.

5. The improvement, as claimed in claim 3, wherein the said flow means comprises capillary grooves.

6. The improvement as claimed in claim 3 wherein the said flow means comprises a plurality of layers of fine mesh screen.

7. The improvement as claimed in claim 3 wherein the ratio of the said cold surface area to the said hot surface area is numerically equal to the ratio of the said heat rejection flux density to the said input heat flux density.

8. The improvement, in a thermionic-thermoelectric converter having a heat transfer flow from a thermionic element to a thermoelectric element, for reducing the heat flux density of the said heat transfer comprising: generally thin stainless steel means cooperating with the said thermionic element and the said thermoelectric element providing an evacuated enclosed volume; a first surface area of the said enclosed volume in thermal contact with the said thermionic element for receiving said heat flow; a second surface area of said enclosed volume in thermal contact with the said thermoelectric element, the said second surface being larger in area than the said first surface; capillary grooves positioned in the said second surface area aligned essentially parallel to the direction of heat transfer; and a small quantity of potassium positioned within the enclosed volume for distributing the heat flow from the said first surface to the said second surface.

References Cited

UNITED STATES PATENTS

| | | | |
|---|---|---|---|
| 3,189,765 | 6/1965 | Danko et al. | 310—4 |
| 3,279,028 | 10/1966 | Hall et al. | 310—4 X |
| 3,302,042 | 1/1967 | Grover et al. | 310—4 |
| 3,321,646 | 5/1967 | Grover et al. | 310—4 |
| 3,329,532 | 7/1967 | Austin et al. | 310—4 X |
| 3,368,084 | 2/1968 | Hall | 310—4 |

FOREIGN PATENTS

| | | |
|---|---|---|
| 1,451,700 | 7/1966 | France. |

MILTON O. HIRSHFIELD, *Primary Examiner.*

D. F. DUGGAN, *Assistant Examiner.*